United States Patent Office 2,747,604
Patented May 29, 1956

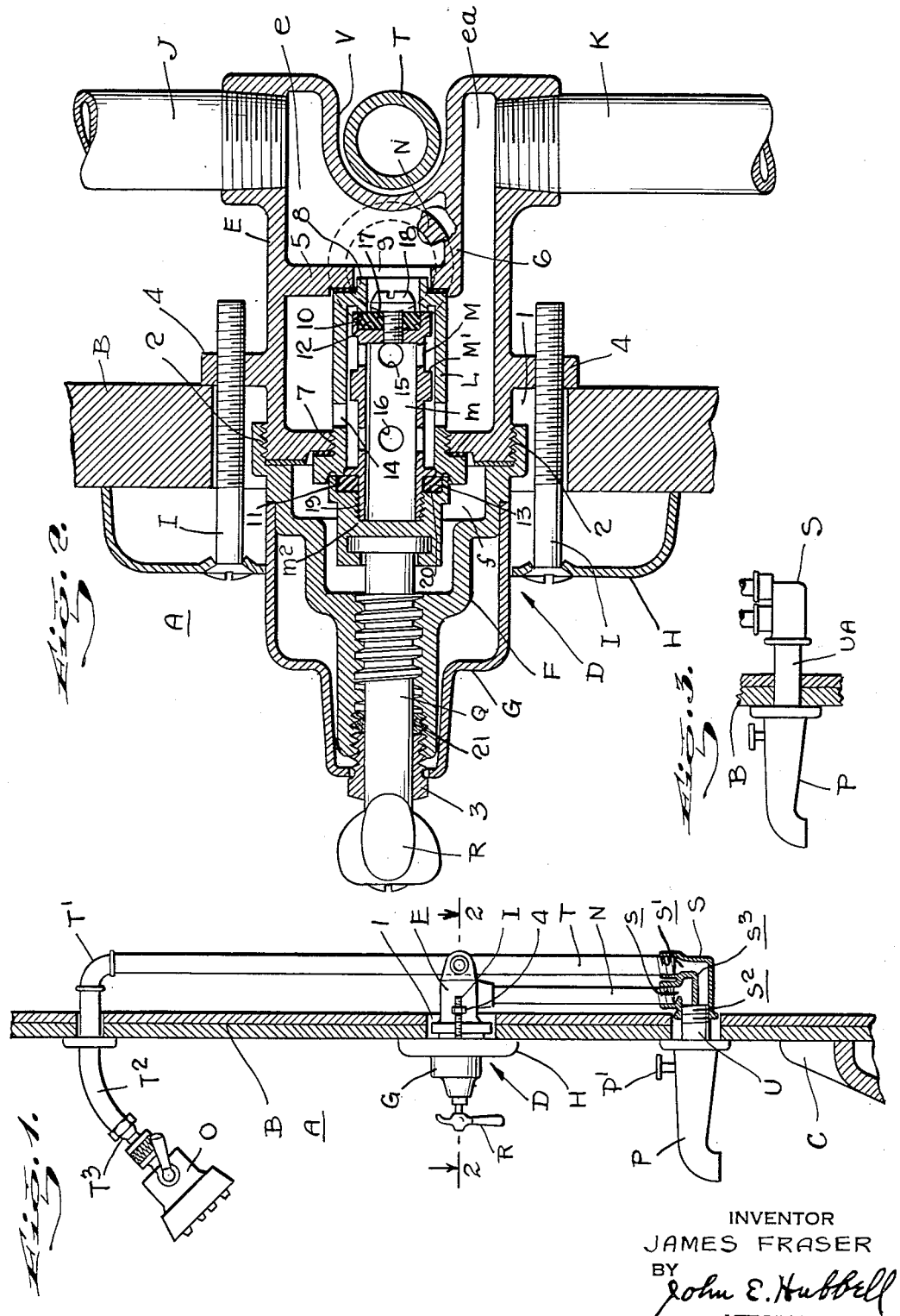

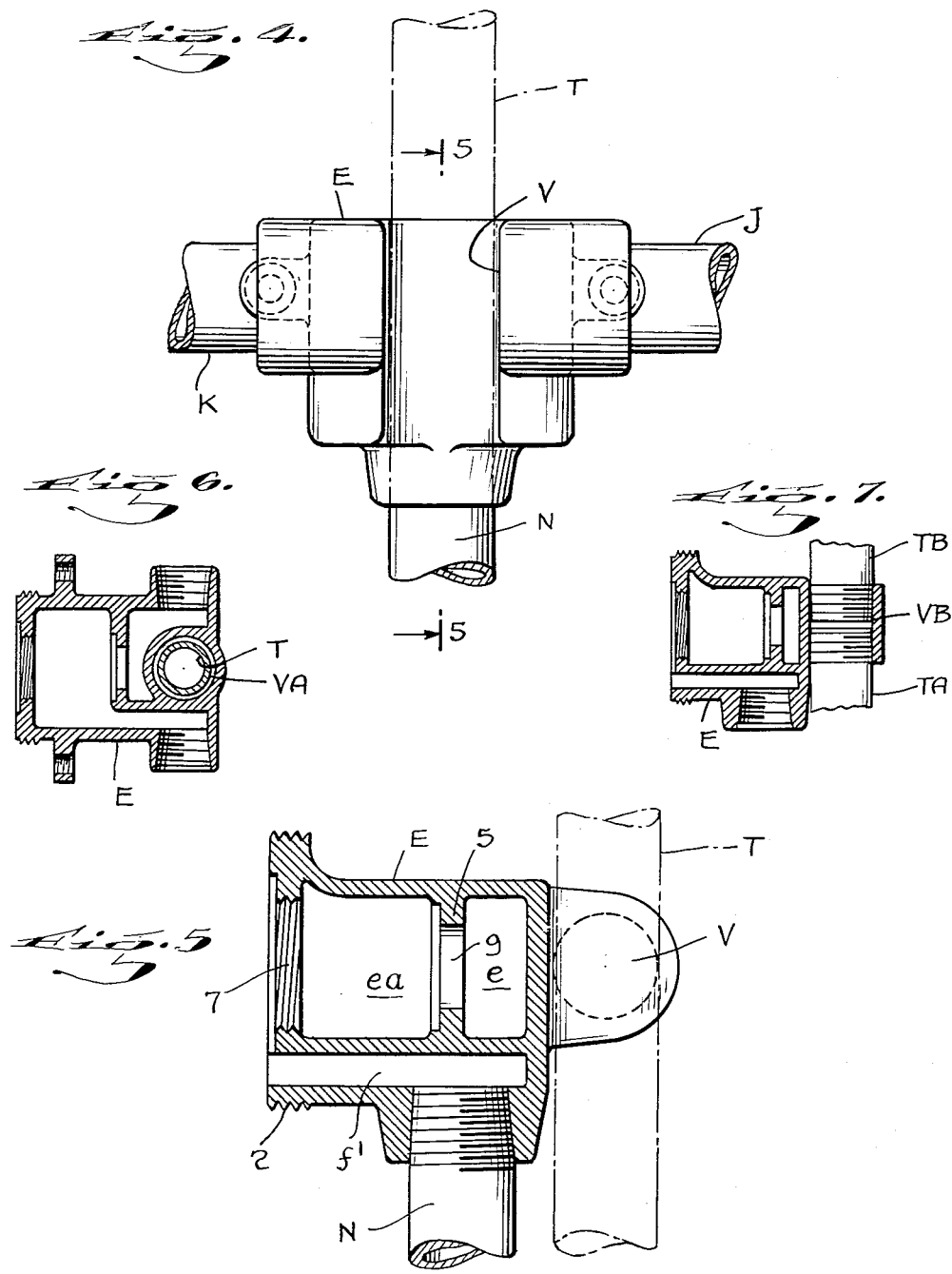

2,747,604

MIXING VALVE

James Fraser, Wilmington, Del., assignor to Speakman Company, Wilmington, Del., a corporation of Delaware Application August 13, 1952, Serial No. 304,109

2 Claims. (Cl. 137—360)

The general object of the present invention is to provide an improved mixing valve, and more particularly, to provide an improved bath or lavatory valve and associated piping for mixing hot and cold water to thereby form a water mixture at a temperature which can be regulated as desired by the user.

More specifically, the object of the invention is to provide a mixing valve for the purpose specified, which is characterized by its relatively light weight, and by the compactness of the valve and associated piping and by the simple and advantageous manner in which the valve and associated piping may be installed in a relatively thin bathroom wall and in a relatively shallow wall space, back of the relatively thin wall.

A more specific but practically important object of the invention is to provide a shower bath assembly comprising a mixing valve extending through a shallow bathroom wall with a compact piping arrangement back of said wall and arranged to optionally discharge the hot and cold water mixture through a showerhead at an upper level in the bathroom, and into a bathtub in the lower portion of the bathroom through a nozzle at a level slightly above the top of the bath tub.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is an elevation partly in section of a portion of a bathroom and its wall in which a mixing valve is mounted;

Fig. 2 is a section on the line 2—2 of Fig. 1;

Fig. 3 is a section taken similarly to Fig. 1, illustrating a modification;

Fig. 4 is a rear elevation of the mixing valve and associated piping shown in Figs. 1 and 2;

Fig. 5 is partial section on the line 4—4 of Fig. 3;

Fig. 6 is a plan section taken similarly to Fig. 2, and illustrating a modification;

Fig. 7 is a sectional elevation illustrating a modification of parts shown in Figs. 2 and 6.

In the drawings, B designates a vertical wall of a bathroom A containing a bath tub C with a portion thereof in contact with the wall B. A mixing valve structure D extends through an opening in the wall B. In the form shown, the structure D comprises a chambered valve body member E and a valve bonnet member F. The member E is wholly back of the wall B except for a portion within the wall opening 1. As shown, the bonnet member F is formed with threaded socket 2 into which the externally threaded outer end of the member E is screwed. The mixing valve structure also includes a casing member G, which surrounds the outer portion of the bonnet F, and is secured to the latter by a stuffing box gland 3. The valve structure D is normally secured in place in the wall opening 1 by means of an escutcheon H and clamping screws I. The escutcheon H surrounds the main cylindrical portion of the casing member G and has a transverse peripheral flange with its end edge engaging the wall B. The clamping screws I extend through the wall opening 1, and are threaded through outwardly extending tug portions or ears 4 of the valve body member E. The screws I co-act with the escutcheon H to clamp the ears 4 against the portion of the wall B surrounding the opening 1.

The space within the body member E is divided by a partition 5 tranverse to the valve axis, and by an extension 6 of the partition 5 which is parallel to said axis, into a hot water inlet chamber $e$ and a cold water inlet chamber $ea$. Hot water is supplied to the chamber $e$ by a pipe J and cold water is supplied to the chamber $ea$ by a pipe K. As shown, the pipes J and K are in alignment with one another and at opposite sides of the body member E and their portions adjacent the valve body E are horizontal and parallel to the wall B. The chamber $ea$ comprises an entrance portion alongside the chamber $e$ by the partition extension 6, and into which the pipe K opens, and comprises a larger portion separated from the chamber $e$ by the partition portion 5. The outer end of the chambered body E is formed with a central, internally threaded opening 7 into which the inner end portion of a tubular valve seat member L is threaded. The latter has an annular inner end shoulder which abuts against the partition 5 and has a nipple-like portion 8 extending into a port or opening 9 in the partition 5. Hot water under pressure in the chamber $e$ passes from the latter into the tubular member L when a tubular valve member M axially movable therein is moved out of the position shown in Fig. 2 in which it prevents flow out of the chamber $e$ through the port 9.

The valve seat member L is formed adjacent its inner and outer ends with outwardly facing rib-like valve seats 10 and 11 respectively. In the closed condition of the mixing valve, the seats 10 and 11 are respectively engaged by valve seat engaging portions 12 and 13, respectively, of the valve member M. The valve member M comprises a tubular body portion surrounding an axial chamber $m$ and having an external diameter smaller than the internal diameter of valve seat member L, except for a peripheral rib or flange portion M' intermediate its ends. The portion M' forms a piston-like barrier separating the portions of the space in the member L surrounding the valve member M and at the opposite ends of the portion M'.

The valve seat member L is formed with radial ports 14 through which the chamber $ea$ is in communication with the space surrounded by the member L and at the outer end of the rib portion M'. The tubular body portion of the valve member M is formed with one set of radial ports 15 at the inner end of the rib M' and another set of radial ports 16 at the outer end of the rib M'. When the valve member M is in its closed position there is no liquid flow through the ports 14, 15 or 16, and no mixing of hot water supplied by the chamber $e$ with cold water supplied by the chamber $ea$. However, when the valve member M is moved out of its closing position, hot water passes from the space $e$ through the port 9 into the adjacent end of the valve seat member L and thence through the ports 15 into the chamber $m$ within the valve member M, and out of that chamber through the ports 16. The hot water passing outwardly through the ports 16 then mixes with the cold water flowing inwardly through the ports 14, and the mixture moves out of the valve seat member L through its then open outer end into the chamber $f$ within the bonnet F. The chamber $f$ is in free communication with a passage $f'$ in the valve body E extending parallel to the axis of the mixing valve to the outlet pipe N, as shown in Fig. 5, and thence, as is hereinafter explained, to the showerhead O or to the bathtub supply nozzle P.

In the desirable construction form shown by way of example, the valve member M includes a detachable inner end section $m'$ comprising a metallic cup holding a washer 17 and detachably connected to the valve member body by a screw 18. At its opposite end the valve body portion of the valve member M includes a detachable outer end section $m^2$. The latter is formed with an internally threaded socket receiving an externally threaded end portion 19 of the body portion of the valve member M. The section $m^2$ is recessed to receive an annular washer 20. The washers 17 and 20 may be formed of customary non-metallic valve washer materials, and respectively abut against the valve seat ribs 10 and 11 of the member L in the closed condition of the mixing valve.

As shown in Fig. 1, the valve section $m^2$ is detachably connected in a conventional manner to the inner end of a valve spindle Q. The latter has an externally threaded portion in threaded engagement with an internal portion of the valve bonnet F at the inner end of a stuffing box 21 into which the previously mentioned gland 3 extends. A handle R is connected to the outer end of the spindle Q.

As shown in Figs. 1, 2 and 3, the water discharge pipe N extends downward from the valve body E and has its lower end threaded into the inlet opening $s$ of a pipe fitting S. The latter is of the known type commonly called a "twin-ell," and has an outlet $s^1$ alongside the inlet $s$ and has a second outlet $s^2$ at right angles to the inlet $s$ and outlet $s'$. A vertical pipe T has its lower end threaded into the outlet $s^1$.

The upper end of the pipe T is connected through an elbow T' to a bent pipe $T^2$. The latter includes a horizontal portion extending through the wall B and a downwardly inclined portion connected to and supporting the showerhead O. The latter may be of any usual or suitable type, and may well be connected to the pipe section $T^2$ by a ball-joint $T^3$. The outlet $s^2$ is connected by a nipple U to the previously mentioned bath tub supply nozzle P. The latter includes a cut-off valve member P' of known type which permits or prevents the passage of water into the bath tub through the nozzle P accordingly as the valve P' is in an upper position or a lower position. When the valve P' is in its lower position, water passing to the "twin-ell" through the pipe N is discharged into the tube through the nozzle P. When the valve P' is in its upper position, the water passing downward through the pipe N to the fitting S, passes away from the latter to the showerhead O through the uprising pipe T and its extensions T', $T^2$ and $T^3$.

As shown in Fig. 1, the twin-ell fitting S is formed with an internal partition or baffle wall $s^3$ comprising a vertical portion and a horizontal portion. As shown, the horizontal baffle portion is at substantially the level of the axis of the outlet $s^2$. The vertical portion of the partition $s^3$ is nearer to the axis of the inlet $s$ than to the axis of the outlet $s'$. Said partition forms an L-shaped flow path to the outlet $s^2$ from the opening $s$, and a U-shaped flow path from the outlet $s^2$ to the outlet $s'$. Each of said paths is longer than it would be if the partition were omitted.

A partition between the two flow paths similar to the partition $s^3$ has been customarily provided heretofore in twin-ell fittings, and is practically essential when each of the above mentioned flow paths is relatively short as they are shown to be in Fig. 1. I have discovered however, that the need for said partition may be eliminated by elongating the path of flow from the inlet $s$ to either of the outlets $s'$ or $s^2$, i. e., by increasing the horizontal distance between the vertical pipes N and T, or by replacing the nipple U by a longer nipple UA as shown in Fig. 3.

In the construction shown in Fig. 2, the valve body member E is formed with a vertical groove V in its inner end wall to receive the pipe T. As shown in Fig. 2, the depth of the groove V is greater than the diameters of the supply pipes J and K, and the pipe T has its axis in the same vertical plane which includes the axes of the horizontal pipes J and K. In the modification shown in Fig. 6, the groove V is replaced by a cylindrical passage VA in the wall of the valve body E through which the pipe T loosely passes. Stated differently, in Fig. 6 the portion of the member E adjacent the pipe T is a ring instead of a trough wall. In the modification shown in Fig. 6, the position of the portion of the pipe T at the level of the valve member E is fixed relative to the member E. The construction shown in Fig. 6 thus contributes to, and insures a more definite spacial relation of the pipe T and valve member E in the so-called "roughing-out" operation, than does the arrangement shown in Fig. 2.

In the modification shown in Fig. 7, the cylindrical passage VA of Fig. 6 is replaced by a passage VB which differs from the passage VA in that its end portions are internally threaded to form a lower threaded socket receiving the upper threaded end of a lower pipe section TA, and an upper threaded socket receiving the threaded lower end of an upper pipe section TB. The two pipe sections TA and TB and the threaded wall surrounding the passage VB collectively serve the purpose of the pipe T shown in Fig. 1.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A mixing valve structure having separate cold and hot water supply inlets and a discharge outlet adjacent one end of the structure, a valve actuator extending out of the valve structure at its opposite end, said valve structure being arranged for mounting in a vertical wall with said inlets and outlet at one side of the wall and with said valve actuator accessible for adjustment at the opposite side of the wall, said inlets having their axes approximately parallel to said wall and at approximately the same distances from the latter and opening at opposite sides of a vertical plane transverse to said wall and intersecting said valve body, and said outlet opening downwardly and having its axis substantially parallel to said wall and nearer to the latter than are said inlets, a discharge pipe connected to said outlet and extending downward away from the latter through the space between said wall and said inlets, said valve structure being formed with an indentation between said inlets, said indentation being of such depth as to extend substantially to the side of the inlets nearest the wall and extending entirely through the casing in a vertical direction, a twin-ell pipe fitting having an inlet to which the lower end of said discharge pipe is connected and having two outlets, one of which is alongside the last mentioned inlet, piping arranged to connect the last mentioned outlet to a showerhead at said opposite side of said wall and above said valve structure and including a lower pipe section having its lower end connected to the last mentioned outlet and having an upper portion within said indentation, and conduit means connected to the second of said twin-ell outlets and arranged to extend horizontally through said wall, valve means mounted in said valve structure for adjustment by said valve actuator to open and close communication between each supply inlet and said discharge outlet and to separately regulate the amount of water passing to said discharge outlet for said supply inlet, and means operable to permit or prevent flow through the conduit means connected to said second twin-ell outlet.

2. A mixing valve structure having separate cold and hot water supply inlets and a discharge outlet adjacent one end of the structure, a valve actuator extending out of the valve structure at its opposite end, said valve structure being arranged for mounting in a vertical wall with said inlets and outlets at one side of the wall and with said valve actuator accessible for adjustment at the opposite side of the wall, said inlets having their axes approximately parallel to said wall and at approximately the same distances from the latter and opening at opposite sides of a vertical plane transverse to said wall and intersecting said valve body, and said outlet opening downwardly and having its axis substantially parallel to said wall and nearer to the latter than are said inlets, a discharge pipe connected to said outlet and extending downwardly away from the latter, a return pipe through the space between said wall and said inlets, said valve structure being formed with an indentation between said inlets, said indentation being of such depth as to extend substantially to the side of the inlets nearest the wall and extending entirely through the casing in a vertical direction, said indentation being adapted to receive said pipe within its confines.

References Cited in the file of this patent

UNITED STATES PATENTS

| | | |
|---|---|---|
| 949,869 | White | Feb. 22, 1910 |
| 1,763,877 | Bowlzer | June 17, 1930 |
| 1,840,961 | Kuenzler | Jan. 12, 1932 |
| 1,969,870 | Arbogast et al. | Aug. 14, 1934 |
| 2,045,308 | Wolff | June 23, 1936 |
| 2,317,051 | Groen | Apr. 20, 1943 |
| 2,519,158 | Symmons | Aug. 15, 1950 |